(12) United States Patent
Malavieille et al.

(10) Patent No.: US 6,655,849 B1
(45) Date of Patent: Dec. 2, 2003

(54) OPTICAL CONNECTOR, PARTICULARLY FOR OPERATING IN HIGH PRESSURE ENVIRONMENT

(75) Inventors: Francois-Louis Malavieille, Chatenay Malabry (FR); Fadhel Rezgui, Sceaux (FR)

(73) Assignee: Alliance Technique Industrielle, Courcouronnes (FR)

( * ) Notice: Subject to any disclaimer, the term of this patent is extended or adjusted under 35 U.S.C. 154(b) by 0 days.

(21) Appl. No.: 09/913,765

(22) PCT Filed: Feb. 17, 2000

(86) PCT No.: PCT/FR00/00401

§ 371 (c)(1), (2), (4) Date: Nov. 16, 2001

(87) PCT Pub. No.: WO00/49440

PCT Pub. Date: Aug. 24, 2000

(30) Foreign Application Priority Data

Feb. 19, 1999 (FR) .............................................. 99 02097

(51) Int. Cl.[7] .................................................. G02B 6/38
(52) U.S. Cl. .............................. 385/60; 385/66; 385/67; 385/72
(58) Field of Search .............................. 385/50, 51, 60, 385/62, 66, 68, 72, 73, 78, 80, 84, 138

(56) References Cited

U.S. PATENT DOCUMENTS

| 4,676,588 A | 6/1987 | Bowen et al. ........... 350/96.21 |
| 4,756,595 A | * 7/1988 | Braun et al. ................... 385/75 |
| 4,850,670 A | 7/1989 | Mathis et al. ............ 350/96.21 |

FOREIGN PATENT DOCUMENTS

| DE | 25 16 858 | 10/1976 | ............. G02B/5/14 |
| JP | 62056907 | 3/1987 | ............. G02B/6/40 |
| JP | 02128144 | 5/1990 | ......... G01N/21/41 |
| JP | 05224094 | 9/1993 | ............. G02B/6/38 |

* cited by examiner

*Primary Examiner*—Brian Healy
*Assistant Examiner*—Kevin S Wood
(74) *Attorney, Agent, or Firm*—Christie, Parker & Hale, LLP

(57) ABSTRACT

The invention concerns an optical fibre connector (15, 18) for high pressure (P) environments. Said connector comprises means for maintaining (1, 2, 19b) the respective ends of the fibres, facing one another. The invention is characterised in that it further comprises a sleeve (3) enclosing the fibre ends, and a translucent gel (4), provided in the sleeve to soak the space (4b) separating the fibre ends (15, 18). Moreover, by maintaining itself by capillary action in said space (4b) the gel seals off the connection with environment. The ambient pressure (P) then acts on one free end of the sleeve (3) while maintaining the gel (4) in the sleeve.

7 Claims, 1 Drawing Sheet

OPTICAL CONNECTOR, PARTICULARLY FOR OPERATING IN HIGH PRESSURE ENVIRONMENT

CROSS-REFERENCE TO RELATED APPLICATION

This application claims priority of International application number PCT/FR00/00401, filed Feb. 17, 2000, which in turn claims priority to French patent application number 99/02097, filed Feb. 19, 1999.

The present invention relates to the field of optical connections. Most specifically, it relates to a connector between two optical fibers, designed to operate in aggressive and/or polluting ambient media, under high pressure.

A connection between two optical fibers is made by placing the respective ends of the fibers one facing the other and, preferably, substantially in contact.

However, the surrounding medium may infiltrate between the two fibers thus generating optical losses. A sealed connection is generally desirable between the two fibers so as to prevent contamination or pollution of their ends.

The connectors normally used for such applications have complex structures which put a strain on their manufacturing costs (most commonly, seals and/or non-return valves). Moreover, this structure is generally bulky, making the use of such a connector prohibitive for certain applications.

The present invention aims to improve the situation.

The invention thus concerns a connector to connect two optical fibers designed to engage one with the other, especially in a high-pressure surrounding medium. This connector comprises means for holding the respective ends of the fibers, substantially one facing the other.

According to a general characteristic of the invention, the connector comprises, in addition, a sleeve surrounding the ends of the fibers, and a substantially translucent gel, placed in the sleeve and of fluidity chosen in order to substantially fill the space separating the ends of the fibers and to substantially seal this space from the surrounding medium thereby being held by capillary action. The ambient pressure then acts on at least one free end of the sleeve while substantially holding the gel in the sleeve.

Advantageously, the gel has a refractive index chosen in order to limit the optical losses from one end of the fiber to the other, in particular Fresnel losses.

Preferably, this gel is made from a material comprising silicones.

According to another advantageous characteristic of the invention, the length and the general diameter of the sleeve are chosen, depending on the lengths of the ends of the fibers, such that the sleeve forms a reservoir for the gel while allowing the gel to fill the interface between the fibers at the time of the connection.

Figure 1:
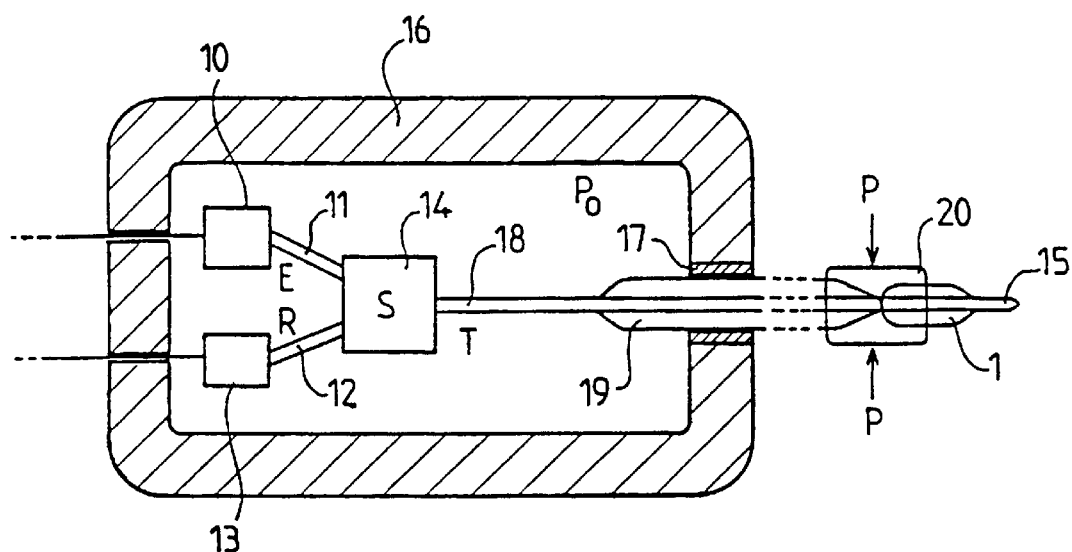
Figure 2:
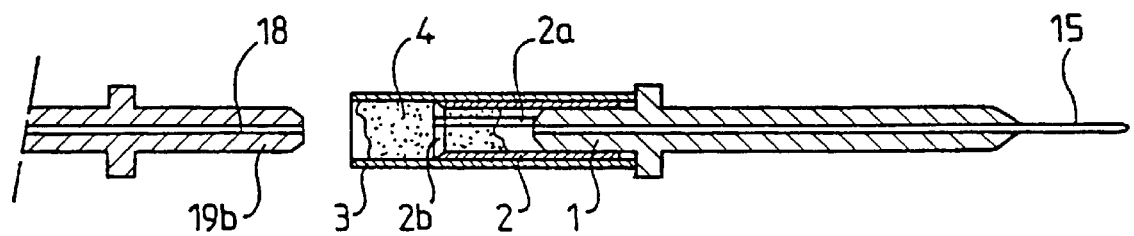
Figure 3:
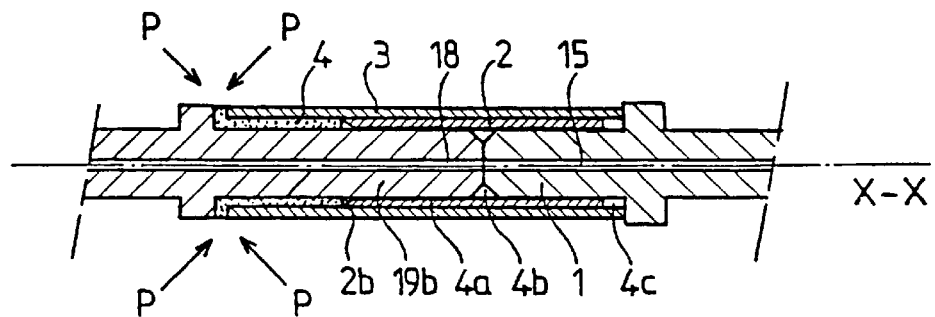

Other advantages and characteristics of the present invention will appear on examining the detailed description below, and the appended drawings, in which:

FIG. 1 shows schematically a system to carry out optical measurements in a high-pressure surrounding medium, and comprising an optical connector according to the invention, FIG. 2 shows a detailed view of the connector according to the invention, before connecting the aforementioned optical fibers, and FIG. 3 shows a detailed view of the connector, with the respective ends of the optical fibers connected.

The drawings contain mostly elements of a certain character. They will be able not only to serve to make the present invention more clearly understood, but also to contribute to its definition, as the case may be. Reference is now made firstly to FIG. 1 in order to describe a system for measuring, by optical means, the level of sea-bed salinity in the example described.

The system comprises an emitting source 10, fitted with an emitting diode coupled to a first branch of the system 11 comprising an optical emitting fiber E. Moreover, this emitting fiber is connected to a transmission fiber 18.

The light beam emitted by the source 10 is carried by the transmission fiber 18 toward a measuring fiber 15 in direct contact with the high-pressure surrounding medium (arrows P). In the example described, the tip of the measuring fiber 15 is profiled in order to measure index variations of the ambient medium, which makes it possible to detect regions of greater salinity.

In practice, an incident beam is reflected to a greater or lesser degree by the dioptric interface formed by the measuring fiber 15 and the ambient medium, depending on the respective refractive indices of the fiber and of the medium. Hence for a ray with an angle of incidence greater than the Brewster angle, the incident ray undergoes at least one reflection and is carried back by the transmission fiber 18 up to a splitter 14 (a semireflecting or other plate) which directs the reflected beam to a second receiving branch R which the system comprises. This receiving branch R is fitted with a fiber 12, which fiber is connected to a receiver 13 (photodetector or other detector).

Depending on the light intensity of the reflected beam, it is possible to calculate the refractive index of the medium surrounding the measuring fiber 15, and to determine, as required, its composition.

Finally, the system comprises cables (electric cables in the example) connected to the emitting source 10 in order to power the aforementioned diode, and to the receiver 13 in order to exploit a signal representative the intensity of the reflected beam.

All the elements of the system, other than the downstream part of the detecting fiber 18 and the measuring fiber 15, are arranged in a hermetic box (isobaric box), which is mainly filled with air of pressure $P_0$, substantially close to atmospheric pressure. The upstream part of the transmission fiber 18 (on the splitter 14 side) fills the hermetic box 16 whereas its downstream part (on the detecting fiber 15 side) is housed in a protective sheath 19. The hermeticity of the box 16 is especially provided by seals 17 surrounding the protective sheath 19.

The transmission fiber, fitted with its sheath, is then designed to be conveyed into the surrounding medium at high pressure P, toward a connector 20 in order to be connected to the optical measuring fiber 15.

In the intended application, the surrounding medium (sea water) comprises well-known contaminants of normal optical fibers, generally made from a material comprising silica and chlorides. In this way, the optical measuring fiber 15, designed to engage directly with the medium, is usually made from a more resistant material, for example sapphire, or else one comprising a protective diamond layer. However, such materials are relatively expensive and the measuring fiber 15 has to be of short length.

In contrast, the downstream part of the transmission fiber 18 must be long enough, in particular to protect the hermetic box 16 from all impacts against the bottom (rock, sand). Its protective sheath 19 is thus preferably made from a material resistant to attack by sea water, while the transmission fiber can be made from a conventional material (comprising silica and chlorides).

However, in order to prevent, in particular, contamination of the end of the transmission fiber 18 facing the measuring fiber 15, it is necessary to provide a sealed connector 20 between the two fibers, particularly given the high pressure P of the ambient medium (a few hundred bar).

Reference may now be made to FIG. 2 in order to describe a connector according to the invention for connecting the transmission fiber 18 and the measuring fiber 15.

The protective sheath 19 of the transmission fiber 18 is extended by an alignment ferrule 19b. For the purpose of making the connection between the fibers easier, the measuring fiber 15 is also housed in an alignment ferrule 1, substantially symmetrically with the ferrule 19b. In the example, the ferrules are of hollow cylindrical shape in order to house tightly the ends of the fibers 18 and 15. Generally, the fibers are immobilized in the ferrules by adhesive bonding and their end faces are polished so as to limit the optical losses in emission and in reception.

The connector comprises a flexible collar 2 of substantially cylindrical hollow shape and of general diameter substantially less than the diameters of the ends of the ferrules 1 and 19b. The collar 2 is designed to keep the respective ends of the ferrules 1 and 19b, one facing the other, preferably substantially in contact. The axes of the ferrules are then substantially coincident with the X-X alignment axis of the fibers (FIG. 3).

In order to introduce the ferrules 1 and 19b into the collar 2, the latter is preferably made from a metal and comprises a slit which extends along one of its generatrices (parallel to the X-X axis), from one ferrule to the other. This slit 2a then gives the collar flexibility by a "spring" effect. The collar 2 is initially fitted over the end of the ferrule 1 of the detecting fiber 15. Next, the end of the ferrule 19b bearing the transmission fiber 18 is forcedly inserted into the collar 2, which then closely houses the respective ends of the ferrules, one facing the other.

A substantially cylindrical hollow sleeve 3 firstly surrounds the collar 2 and the ends of the ferrules 1 and 19b. In addition, a refractive index matching gel 4 is applied inside the sleeve, this forming a reservoir for the gel 4.

When the ferrule 19b of the transmission fiber 18 is introduced into the sleeve 3, then into the split collar 2, the gel 4, contained in the reservoir formed by the sleeve 3, is distributed by a piston effect in all the interfaces of the connection and in particular in the interface 4b separating the two fibers 15 and 18. The slit 2a of the collar 2 then forms an opening for the gel 4 to flow back, the surplus of which accumulates in the cylindrical cavity provided between the sleeve 3 and the ferrule 19b (on the transmission fiber 18 side), this cavity again forming a reservoir for the gel 4.

The Applicant has noted that one of the numerous advantages provided by the present invention thus consists in that this backflow of gel during connection drives out any impurities present in the interface 4b, these being entrained by the gel forced back toward the outside of the collar 2. Thus, in addition, connecting fibers by means of a connector according to the invention ensures their ends are cleaned.

Preferably, the collar 2 comprises end faces 2b substantially flared outward, forming a groove to make it easier to introduce the ferrule 19b into the collar.

Moreover, one of the ends of the sleeve 3 (on the detecting fiber 15 side, in the example described) is preferably sealed shut on one of its ferrules (ferrule 1).

As shown in FIG. 3, the pressure of the external medium (arrows P) acts on the free end of the sleeve 3 (on the transmission fiber 18 side) by holding the gel 4 in the sleeve. In addition, the high-pressure water can infiltrate via this free end by pushing the gel toward the space 4b between the of the ferrules. The general diameter of the sleeve is chosen, depending on the shape of the ferrules, such that the gel fills in particular the interface 4b.

Moreover, the diameter of the sleeve is optimized as a function of the fluidity of the gel 4. In this way, once the fibers are connected, if it happens that the space 4b between the fibers increases substantially, part of the gel 4 coming in particular from the cylindrical cavity forming a reservoir occupies the whole interface 4b by capillary action in addition.

Preferably, the sleeve 3 is made from a material comprising fluoropolymers, of the heat-shrinkable KYNAR (registered trademark) type, and one of its ends is closed off by heat-shrinking onto the ferrule 1 of the detecting fiber 15.

Thus, the surrounding high-pressure medium contributes to sealing the connection between the fibers by pushing the gel back toward the inside of the collar, in particular between the two ferrules. The gel, itself subjected to the external pressure P, does not leak.

Advantageously, this gel, made from a material comprising silicones, is resistant to sea water (not washed out), does not coagulate and hardly expands or contracts with any variations in temperature or pressure. Thus, the only dioptric interfaces formed between the two fibers are the interfaces between the gel and the respective ends of the fibers. Moreover, the refractive index of the gel is chosen so as to limit the optical losses linked to the connection (Fresnel losses). This is because the rays passing through the gel remain concentrated on the X-X axis.

According to another advantage provided by the present invention, the connector thus formed has a compact overall structure and, in particular, quite a thin profile in order not to generate perturbations in the measurements, which would result from a variation in the flow of the surrounding medium, caused by the connector.

Moreover, the simplicity of assembling the connector in the example described above makes it possible to quickly replace the measuring probe of the system (measuring fiber 15, alignment ferrule 1, collar 2 and sleeve 3), if the detecting fiber 15, made from sapphire in the example described, breaks following a shock.

Of course, the present invention is not limited to the embodiment described above by way of example. It extends to other variants.

Thus it will be understood that the measuring fiber 15 may carry out measurements other than those of refractive index, for example fluorescence measurements, ellipsometry measurements or other measurements. For example, for fluorescence measurement, the splitter 14 in FIG. 1 may comprise an optical interference filter, preferably centered on the emission wavelength of the aforementioned diode. Such a filter mainly transmits the wavelength of the diode and substantially reflects the fluorescence wavelength. Advantageously, the gel 4 maintains the polarizations of the emitted and received beams. Thus, in addition, it is possible to carry out the aforementioned ellipsometry measurements by modulating in particular the polarization of the emitted beam.

Moreover, the means for holding the fibers one facing the other (split collar 2 and alignment ferrules 1 and 19b) are described above by way of example. Any other type of means for holding fibers can be envisioned, provided it is not fully sealed (such as split collar 2 in the example), in order to allow the surrounding medium to exert pressure on the ends of the sleeve and on the gel, in particular by allowing the gel to fill the interface between the two ends of the fibers 15 and 18.

The materials in which the elements of the connector 20 are made are mentioned above by way of example. However, the gel, made from a material comprising silicones, has the advantages described above (not easily washed out by sea water, not easily coagulated, adequate fluidity). Moreover, the sleeve made from KYNAR and the nonoxidizing alignment ferrules are generally little affected by chemical attack by sea water.

Of course, the cylindrical shapes of the various elements of the connector are described above by way of example, and are likely to exhibit variants.

In addition, the application of the connector according to the invention to the measurement of the level of salinity of seabeds from the refractive index of sea water is described above by way of example. The invention also finds applications in other fields, such as agri-foodstuffs (for example in measuring the butter content in milk), or in studying the composition of heterogeneous media (comprising for example gases, water and/or oils, of different respective refractive indices)

In the application described above by way of example, one of the connected fibers 15 comprises, at some distance from the connector, an end comprising an optical sensor for measuring the variations in refractive index. As a variant, the connector according to the invention can also be applied to the connection between two transmission fibers, for example.

Finally, the present invention can in addition relate to a method of connection with a connector according to the invention, in particular comprising the step of introducing the ferrule 19b into the sleeve 3 comprising the gel 4 (FIGS. 2 and 3).

What is claimed is:

1. A connector for optical fibers for use in high pressure atmospheres having means for holding respective ends of first and second optical fibers such that the respective end of the first fiber substantially faces the respective end of the second fiber, the holding means comprising:

a first cylindrical hollow alignment ferrule for housing and immobilizing the respective end of the first fiber;

a second cylindrical hollow alignment ferrule for housing and immobilizing the respective end of the second fiber;

a substantially flexible, hollow collar having a substantially cylindrical shape, wherein diameter of the flexible collar is less than diameter of the first and second alignment ferrules to closely house respective ends of the first and second alignment ferrules substantially one facing the other;

a sleeve surrounding the collar; and a substantially translucent gel placed in the sleeve, the fluidity of the translucent gel adapted to substantially fill a space separating the respective ends of the first and second fibers and to substantially seal the space from a surrounding medium thereby holding the respective ends of the first and second fibers in the space by capillary action, whereas ambient pressure in the surrounding medium acts on at least one free end of the sleeve while substantially holding the gel in the sleeve;

wherein the collar comprises a slit forming a passage for the gel extending substantially from the first ferrule to the second ferrule.

2. The connector as claimed in claim 1 wherein the gel has a refractive index chosen in order to limit the optical losses from one end of the fiber to the other.

3. The connector as claimed in claim 2, wherein the gel is made from a material comprising silicones.

4. The connector as claimed in claim 1 wherein the general diameter of the sleeve is chosen such that the gel is able to be kept at least between the respective ends of the first and second fibers by capillary action, and in a cavity which communicates with the surrounding medium and is formed between an internal surface of the sleeve and the first and second ferrules facing the free end of the sleeve.

5. The connector as claimed in claim 1 wherein the sleeve comprises a free end, communicating with the surrounding medium, and an end which is substantially closed around one of the first or second fibers.

6. The connector as claimed in claim 1 further comprising an optical sensor coupled to an end opposite of the respective end of either the first or second fiber.

7. The connector as claimed in claim 1 wherein the diameter of at least a portion of the flexible collar expands in order to closely house respective ends of the first and second alignment ferrules substantially one facing the other.

* * * * *